(12) United States Patent
Bennett

(10) Patent No.: US 7,608,550 B2
(45) Date of Patent: Oct. 27, 2009

(54) FIRE RETARDANT FIBERGLASS MAT

(75) Inventor: Glenda Beth Bennett, Toledo, OH (US)

(73) Assignee: Johns Manville, Denver, CO (US)

( * ) Notice: Subject to any disclaimer, the term of this patent is extended or adjusted under 35 U.S.C. 154(b) by 594 days.

(21) Appl. No.: 11/267,346

(22) Filed: Nov. 4, 2005

(65) Prior Publication Data

US 2007/0105467 A1    May 10, 2007

(51) Int. Cl.
*B32B 27/04* (2006.01)
*B32B 27/12* (2006.01)
*B32B 5/02* (2006.01)

(52) U.S. Cl. .................. 442/136; 442/172; 442/348; 428/920; 428/921

(58) Field of Classification Search ............. 442/136, 442/138, 172, 414, 348; 428/920, 921
See application file for complete search history.

(56) References Cited

U.S. PATENT DOCUMENTS

| | | | |
|---|---|---|---|
| 3,151,365 A | 10/1964 | Glaser et al. | |
| 3,212,529 A | 10/1965 | Ullman et al. | |
| 3,861,425 A | 1/1975 | Clark | |
| 3,945,962 A | 3/1976 | Clark | |
| 4,112,174 A | 9/1978 | Hannes et al. | |
| 4,256,786 A | 3/1981 | Dias et al. | |
| 4,358,500 A | 11/1982 | George et al. | |
| 4,371,579 A | 2/1983 | McCaskey et al. | |
| 4,428,999 A | 1/1984 | George et al. | |
| 4,661,398 A | 4/1987 | Ellis | |
| 4,762,746 A | 8/1988 | Wesch et al. | |
| 5,094,781 A | 3/1992 | Miyata et al. | |
| 5,130,184 A | 7/1992 | Ellis | |
| 5,194,184 A | 3/1993 | Takeyama et al. | |
| 5,391,344 A | 2/1995 | Rains et al. | |
| 5,840,413 A | 11/1998 | Kajander | |
| 6,153,674 A * | 11/2000 | Landin ................. | 524/35 |
| 6,271,156 B1 | 8/2001 | Gleason et al. | |
| 6,368,991 B1 * | 4/2002 | Horner et al. ......... | 442/374 |
| 6,412,154 B1 | 7/2002 | Plotz | |
| 6,630,046 B1 | 10/2003 | Plotz | |
| 7,247,666 B2 * | 7/2007 | Urabe et al. .......... | 524/116 |
| 2006/0178462 A1 * | 8/2006 | Tour et al. ............ | 524/430 |

FOREIGN PATENT DOCUMENTS

JP    2002-322374    11/2002

* cited by examiner

*Primary Examiner*—Norca L Torres-Velazquez
(74) *Attorney, Agent, or Firm*—Robert D. Touslee

(57) ABSTRACT

Dispersion of a fire retardant agent in a binder used to form a fire retardant fiberglass mat allows for easy and uniform incorporation of the fire retardant agent into the fire retardant fiberglass mat. The fire retardant fiberglass mat is bonded to a fiberglass insulation batt, providing fire retardant composite useful as duct board or equipment liner.

21 Claims, No Drawings

FIRE RETARDANT FIBERGLASS MAT

TECHNICAL FIELD

The present invention relates to fire retardant fiberglass mats. More specifically, the present invention relates to a fire retardant fiberglass facer mat bonded to a face of a fiberglass duct board or equipment liner and imparts self-extinguishing properties to the composite.

BACKGROUND

Fiberglass mats are made in many weights and sizes and can be used for a variety of applications. A general discussion of glass fiber technology is provided in "Fiber Glass" by J. Gilbert Mohr and William P. Row, Van Nostrand, Reinhold Co., New York 1978, which is hereby incorporated by reference. Fiberglass mats of the nonwoven type are generally known.

In the manufacture of wet laid nonwoven mats containing a large proportion of glass fibers, typically used binders such as urea-formaldehyde resins or polyvinyl acetate, styrene butadiene rubber and acrylic copolymer latexes, will burn. Even polyvinyl chloride resin systems, if not high enough in chloride, will burn and may emit hydrogen chloride and heavy smoke.

Fire retardancy for glass mats has been attempted using various methods. For example, in U.S. Pat. No. 6,368,991, issued to Horner, Jr. et al., there is disclosed a low fiber, plyable facer suitable for use in the construction industry, particularly for insulation board manufacture. The facer comprising a dry preformed fiber mat containing a binder for the fibers preferably a preformed glass mat, coated with a prefoamed composition which contains a thixotropic polymer latex, a foam sustaining amount of a surfactant and a flame retarding and/or strengthening amount of a mineral filler.

U.S. Pat. No. 5,840,413, issued to Kajander, describes a fiberglass mat composition comprising a fiberglass matrix bonded with fire retardant melamine resin binder composition capable of forming a nonwoven mat having at least 27% by weight nitrogen in the dry, but uncured resin, and wherein the mat has no more than a catalytic amount of any phosphorus compound present. In one embodiment, the binder can contain pigments, such as carbon black, in amounts up to 25% based on the weight of the resin binder.

There is a constant search, however, for improvements in the fire retardancy of glass mats, particularly for glass mats to be used as a facer for duct board and equipment liner, so as to impart improved self-extinguishing properties to the laminate. An effective and improved self-extinguishing facer mat would be of great benefit to the duct and liner industry.

It is therefore an object of the present invention to provide a fire retardant fiberglass mat containing a fire retardant agent that is effective and easily and uniformly incorporated into the fire retardant fiberglass mat.

It is also an object of the present invention to provide such a mat which can be suitably used as a facer mat for a duct or equipment liner composite.

These and other objects of the present invention will become apparent to the skilled artisan upon a review of the following description, and the claims appended thereto.

SUMMARY OF THE INVENTION

The present invention provides a fire retardant fiberglass mat containing a fire retardant agent that is easily and uniformly incorporated into a fire retardant fiberglass mat.

In one embodiment, the present invention provides a fire retardant fiberglass mat comprising glass fibers, a binder, and a fire retardant containing package comprised of carbon black and a metal hydroxide, preferably magnesium hydroxide or aluminum trihydroxide. The fire retardant package is preferably dispersed in the binder and, in a most preferred embodiment, the fire retardant package further includes a halogen compound, a phosphorous compound or a nitrogen compound.

In another embodiment, the present invention provides fire retardant fiberglass insulation comprising a fiberglass insulation batt and a fire retardant fiberglass facer mat bonded to the fiberglass insulation. The fire retardant fiberglass facer mat comprises glass fibers, a binder, and a fire retardant package dispersed in the binder.

In a further embodiment, the present invention provides a method of forming fire retardant fiberglass insulation comprising forming a fire retardant fiberglass facer mat. The fire retardant fiberglass facer mat comprises glass fibers, a binder, and a fire retardant package dispersed in the binder. The fire retardant fiberglass facer mat is bonded to a face of a fiberglass insulation batt.

DETAILED DESCRIPTION OF THE INVENTION

According to the present invention, a fire retardant agent is dispersed in a binder used to form a fire retardant fiberglass mat. By dispersing the fire retardant agent in the binder, the fire retardant agent is incorporated into the fire retardant fiberglass mat in one step. Additionally, dispersing the fire retardant agent in the binder allows for uniform incorporation of the fire retardant agent in the fire retardant fiberglass mat.

The fire retardant agent of the present invention contains carbon black and a metal hydroxide, with magnesium hydroxide or aluminum trihydroxide being a preferred metal hydroxide. The carbon black and metal hydroxide combination effectively delays ignition and retards combustion of the fire retardant fiberglass mat of the present invention. Magnesium hydroxide exhibits flame retardant properties by releasing water through endothermic decomposition at 330° C., about 100° C. higher than the decomposition temperature of trihydroxide. Accordingly, magnesium hydroxide is preferred over aluminum trihydroxide when the processing temperatures associated with the manufacture of the fire retardant fiberglass mat and the insulation batt are above 230° C. The mechanism of the self-extinguishing properties of a metal hydroxide such as magnesium hydroxide, combined with carbon black, has been found to be most effective in their fire retardancy properties for glass mats. Incorporating the metal hydroxide and carbon black in the binder also permits easy and uniform incorporation into the glass mat.

In a preferred embodiment, the fire retardant package further comprises a halogenated compound, a nitrogen compound or a phosphorus compound. Most preferably, the package comprises the carbon black, metal hydroxide and a halogenated compound. The presence of such halogenated fire retardants are most preferred as they interfere with the free radical mechanism of combustion in the gas phase, thereby stopping the exothermic processes.

Of the halogenated compounds useful, any of the known halogenated fire retardant compounds can be employed. However, the brominated compounds, such as brominated aliphatic compounds, are most preferred. Any known nitrogen or phosphorus containing compounds can also be used, with nitrogen compounds such as melamine and phosphorus compounds such as the polyphosphates being examples of useful compounds for the fire retardant package.

The glass fibers that can be used to make mats can have various fiber diameters and lengths dependent on the strength and other properties desired in the mat as is well known. It is preferred to use glass fibers having diameters in the range of 3 to 20 microns, most preferably 10 to 14 microns. Normally the glass fibers used all have about the same length, such as 0.75±0.08 inch, but fibers of different lengths and diameters can also be used to get different characteristics in a known manner. Fibers up to about 3 inches in length can be used in a wet process for making fiberglass mats. A process for making nonwoven fiberglass mats is described in U.S. Pat. No. 4,112, 174, which reference is hereby incorporated by reference. Any known method of making nonwoven mats can be used.

The preferred technique for the making of mats of the present invention is forming a dilute aqueous slurry of fibers and depositing the slurry on to a moving screen forming wire to dewater the slurry and form a wet nonwoven fibrous mat, transferring the wet, unbonded mat to a second moving screen running through a binder application saturating station where the acrylic, urea-formaldehyde and/or melamine formaldehyde binder, usually in aqueous solution, is applied to the mat, removing excess binder, and drying the unbonded, wet mat and curing (polymerizing) the binder bonding the fibers together in the mat. Preferably, the aqueous binder solution is applied using a curtain coater or a dip and squeeze applicator. In the drying and curing oven the mat is subjected to temperatures of 250-450 or 500° F. for periods not exceeding 4 or 5 minutes. Alternative forming methods include the use of well known cylinder forming and "dry laying".

The preferred mat compositions of the present invention are described in Table 1 below. The percentages in Table 1 are based on the total weight of the finished mat.

TABLE 1

| Ingredient | Weight Percent | Preferred Weight Percent |
| --- | --- | --- |
| Binder | 5-50 | 10-30 |
| Glass Fibers | 50-95 | 70-90 |

Optionally, the glass mat can contain other fibers besides glass fibers in a minor amount.

Preferably, the binder is acrylic, urea-formaldehyde and/or melamine formaldehyde binder. This binder can be used with or without additional additives. Additives such as pigments, defoamers, catalysts, plasticizers and processing aids, within the limitations defined herein, can be used.

The fire retardant package can be mixed into the binder prior to application of the binder to the glass fibers to make the mat. Mixing or incorporating the fire retardant package of e.g., carbon black, metal hydroxide and preferably halogen compound, into the binder composition can be by any conventional means. The amounts of each individual component of the package can vary greatly, depending on the particular effect desired. The components can also be mixed separately, individually, or together.

After application of the binder to the mat of glass fibers, the mat is fully dried and the binder is fully cured. The curing of the glass fiber mat with a binder applied thereto as described herein is generally very quick depending upon the temperature and time treatment. Generally, the temperature ranges from about 300 to about 500° F. with a period of time at that temperature of less than 5 minutes, preferably from about 10 seconds to 2 minutes, and most preferably from about 1 to 10 seconds.

The fire retardant fiberglass mat is then bonded to a fiberglass insulation batt to form fire retardant fiberglass insulation. One method of bonding the fire retardant fiberglass mat to the fiberglass insulation batt involves forming a fiberglass insulation batt on an already formed fire retardant fiberglass mat. This may be accomplished by applying the formed fire retardant fiberglass mat to a collection chain on which the fiberglass insulation batt is formed. In another method, a formed fire retardant fiberglass mat is bonded to a formed fiberglass insulation batt. The fire retardant fiberglass insulation thickness may range between 0.5-2 inches.

Examples of the fiberglass insulation batt to which the fire retardant fiberglass mat of the present invention may be bonded include, for example, fiberglass duct liner, such as Linacoustic RC™, and fiberglass equipment liner, such as Micromat®. Fiberglass duct liners are often designed for lining sheet metal ducts in air conditioning, heating and ventilating systems and may help to control both temperature and sound. Fiberglass equipment liners are often blanket-type fiberglass insulation, recommended specifically for use as a thermal and acoustical control liner in HVAC equipment, though they may also be suited for other equipment applications requiring effective thermal and acoustical control, low air friction, damage resistance, and attractive appearance. Applications of fiberglass equipment liners often include air conditioners, furnaces, VAV boxes, roof curbs, and other HVAC equipment, as properties of fiberglass equipment liners often include high thermal and acoustical performance; resistant to air erosion; ease of handling, fabrication, and installation; and abuse resistant.

EXAMPLES

The Examples are provided to be illustrative of the present invention, but not limiting. All percentages are by weight unless otherwise stated.

Example 1

A wet laid nonwoven fiberglass mat containing 75% 13 micron glass fibers and 25% binder was made. The binder comprised a styrene acrylate latex with a metal hydroxide and halogen containing compound fire retardant package, as well as 10-15 wt. % carbon black. The fiberglass mat was bonded to a fiberglass insulation batt by applying the fiberglass mat to a collection chain on which the fiberglass insulation batt was formed. The composite was found to be self-extinguishing when exposed to a flame in a vertical position.

Comparative Example 1

A wet laid nonwoven fiberglass mat of 1.4 lb/CSF containing 25% binder was made. The binder contained acrylic latex resin (Noveon HyStretch® V-29), urea-formaldehyde, and carbon black. The fiberglass mat did not perform as well as the fiberglass mat of Example 1 when exposed to a flame in a vertical position or a horizontal position.

Comparative Example 2

A wet laid nonwoven fiberglass mat similar to the wet laid nonwoven fiberglass mat of Example 1 was made, except no fire retardant package containing magnesium hydroxide and carbon black was included. The composite failed the same flame test used in Example 1.

Thus, according to the present invention, the combination of carbon black and metal hydroxide, particularly in combination with a halogenated compound, has been found to be a highly effective fire retardant agent when incorporated into a fiberglass mat. Further, the fire retardant combination of the present invention can effectively, easily, and uniformly be incorporated into the fire retardant fiberglass mat, by way of the binder, which can be used as a facer mat for a duct or equipment liner composite.

Example 2

In Table 2 below, the results of various fire retardant packages are shown. All of the packages contain carbon black in addition to the components noted in the Table. The binder employed for each sample was an acrylic latex binder. In Table 2 below, ATH is aluminum trihydroxide, N is nitrogen as provided by melamine unless otherwise noted, UF is urea-formaldehyde, P is phosphorus as provided by a polyphosphate.

TABLE 2

| | | ASTME-84 | | Vertical Burn | | |
|---|---|---|---|---|---|---|
| | | | | Did Not Combust | Time | Burn Length |
| Sample | Package | Flame | Smoke | # of Samples | (sec.) | (in.) |
| 1 | N + ATH + DBDPO + Sb2O3 | 10.8 | 35.3 | 5/5 | 0 | 0 |
| 2 | PVC (Cl) + SbO + Clay | 13.7 | 15.4 | 4/5 | 0.27 | 1.5 |
| 3 | Aliphatic bromine + ATH | 18.4 | 7.3 | 2/5 | 0.47 | 2.24 |
| 4 | N + ATH | 13.1 | 11.9 | 3/5 | 0.32 | 1.88 |
| 5 | Aliphatic bromine + ATH | 13.4 | 7.3 | 3/5 | 0.5 | 2.25 |
| 6 | Type 30 + ATH + P | 20.9 | 16.3 | 3/5 | 0.33 | 2.13 |
| 7 | Intumescent + P | 14.8 | 10.1 | 1/5 | 8.32 | 2.69 |
| 8 | N + ATH | 15.7 | 31.7 | 4/5 | 1.29 | 2 |
| 9 | Brominated | 16 | 15.9 | 2/5 | 0.32 | 1.58 |
| 10 | N + ATH | 15.1 | 24.6 | 2/5 | 0.323 | 1.23 |
| 11 | PVC (Cl) + SbO + Clay | 12.1 | 5.1 | 3/5 | 0.305 | 1.25 |
| 12 | 25% UF (N) | 20 | 5 | 1/30 | 1.78 | 2.63 |

While the forms of the invention herein disclosed constitute presently preferred embodiments, many others are possible. It is not intended herein to mention all of the possible equivalent forms or ramifications of the invention. It is understood that terms used herein are merely descriptive rather than limited, and that various changes obvious to one of ordinary skill in this technology may be made without departing from the spirit or scope of the invention.

What is claimed is:

1. A fire retardant fiberglass mat comprising:
   a) 50 to 95 weight percent glass fibers;
   b) 5 to 50 weight percent binder; and
   c) a fire retardant composition comprised of a metal hydroxide and carbon black dispersed in the binder.

2. The fire retardant fiberglass mat of claim 1, wherein the fire retardant composition further comprises a halogen compound, a nitrogen compound or a phosphorus compound.

3. The fire retardant fiberglass mat of claim 1, wherein the fire retardant composition further comprises a halogen compound.

4. The fire retardant fiberglass mat of claim 3, wherein the halogen compound is a halogenated aliphatic carbon compound.

5. The fire retardant fiberglass mat of claim 1, wherein the binder comprises one or more binders selected from the group consisting of acrylic binder, urea-formaldehyde binder, melamine formaldehyde binder, and combinations thereof.

6. The fire retardant fiberglass mat of claim 1, wherein the binder comprises 10 to 30 weight percent of the fire retardant fiberglass mat and the glass fibers comprise 70 to 90 weight percent of the fire retardant fiberglass mat.

7. The fire retardant fiberglass mat of claim 1, wherein the metal hydroxide comprises magnesium hydroxide or aluminum trihydroxide.

8. Fire retardant fiberglass insulation comprising:
   a) a fiberglass insulation batt; and
   b) a fire retardant fiberglass facer mat bonded to the fiberglass insulation, the fire retardant fiberglass facer mat comprising:
      i) 50 to 95 weight percent glass fibers;
      ii) 5 to 50 weight percent binder; and
      iii) a fire retardant composition comprised of a metal hydroxide and carbon black dispersed in the binder.

9. The fire retardant fiberglass insulation of claim 8, wherein the fire retardant composition further comprises a halogen compound, a nitrogen compound or a phosphorus compound.

10. The fire retardant fiberglass insulation of claim 8, wherein the fire retardant composition further comprises a halogen compound.

11. The fire retardant fiberglass insulation of claim 10, wherein the halogen compound is a halogenated aliphatic carbon compound.

12. The fire retardant fiberglass insulation of claim 8, wherein the binder comprises one or more binders selected from the group consisting of acrylic binder, urea-formaldehyde binder, melamine formaldehyde binder, and combinations thereof.

13. The fire retardant fiberglass insulation of claim 8, wherein the binder comprises 10 to 30 weight percent of the fire retardant fiberglass facer mat and the glass fibers comprise 70 to 90 weight percent of the fire retardant fiberglass mat.

14. The fire retardant fiberglass insulation of claim 8, wherein the metal hydroxide comprises magnesium hydroxide or aluminum trihydroxide.

15. The fire retardant fiberglass insulation of claim 8, wherein the fiberglass insulation batt is fiberglass duct liner.

16. The fire retardant fiberglass insulation of claim 8, wherein the fiberglass insulation batt is fiberglass equipment liner.

17. A method of forming fire retardant fiberglass insulation comprising:
  a) forming a fire retardant fiberglass facer mat comprising:
    i) 50 to 95 weight percent glass fibers;
    ii) 5 to 50 weight percent binder; and
    iii) a fire retardant composition comprised of a metal hydroxide and carbon black dispersed in the binder; and
  b) bonding the fire retardant fiberglass facer mat to a face of a fiberglass insulation batt.

18. The method of claim 17, wherein the binder comprises 10 to 30 weight percent of the fire retardant fiberglass facer mat and the glass fibers comprise 70 to 90 weight percent of the fire retardant fiberglass mat.

19. The method of claim 17, wherein the fire retardant composition further comprises a halogen compound, nitrogen compound or phosphorus compound.

20. The method of claim 17, wherein the fiberglass insulation batt is fiberglass duct liner.

21. The method of claim 17, wherein the fiberglass insulation batt is fiberglass equipment liner.

* * * * *